United States Patent
Sirton et al.

(10) Patent No.: US 10,929,341 B2
(45) Date of Patent: Feb. 23, 2021

(54) ITERATIVE OBJECT SCANNING FOR INFORMATION LIFECYCLE MANAGEMENT

(71) Applicant: NetApp, Inc., Sunnyvale, CA (US)

(72) Inventors: Guy Sirton, Delta (CA); Oliver Erik Seiler, New Westminster (CA); Robin Scott Mahony, Vancouver (CA); Vladimir Radu Avram, Vancouver (CA)

(73) Assignee: NETAPP, INC., Sunnyvale, CA (US)

( * ) Notice: Subject to any disclaimer, the term of this patent is extended or adjusted under 35 U.S.C. 154(b) by 281 days.

(21) Appl. No.: 15/582,423

(22) Filed: Apr. 28, 2017

(65) Prior Publication Data

US 2018/0314706 A1   Nov. 1, 2018

(51) Int. Cl.
*G06F 16/11* (2019.01)
*G06F 16/23* (2019.01)
*G06F 16/182* (2019.01)
*H04L 29/08* (2006.01)

(52) U.S. Cl.
CPC ........ *G06F 16/122* (2019.01); *G06F 16/1834* (2019.01); *G06F 16/1837* (2019.01); *G06F 16/2365* (2019.01); *H04L 67/1097* (2013.01)

(58) Field of Classification Search
CPC .. G06F 16/122; G06F 16/125; G06F 16/1837; G06F 16/2365; G06F 16/1834; H04L 67/1097
USPC ........................................ 707/687, 689, 694
See application file for complete search history.

(56) References Cited

U.S. PATENT DOCUMENTS

| | | | | |
|---|---|---|---|---|
| 8,180,813 B1* | 5/2012 | Goodson | ............... | G06F 16/907 707/827 |
| 8,595,184 B2* | 11/2013 | Zeng | ..................... | G06F 16/907 707/611 |
| 9,378,067 B1* | 6/2016 | Agarwala | ......... | G06F 15/17331 |
| 9,727,522 B1* | 8/2017 | Barber | .................. | G06F 9/5016 |
| 2008/0281982 A1* | 11/2008 | Yanagihara | ........... | H04L 67/104 709/242 |
| 2010/0036869 A1* | 2/2010 | Lowry | ..................... | G06F 8/20 707/E17.009 |

(Continued)

OTHER PUBLICATIONS

White Paper "Information lifecycle Management Vision", Sun Microsystems, Dec. 2005, 10 pages, retrieved on Apr. 13, 2017 from ILM Vision—http://www.vbds.nl/downloads/pub08.pdf.

(Continued)

*Primary Examiner* — Hares Jami
(74) *Attorney, Agent, or Firm* — Haynes and Boone, LLP

(57) ABSTRACT

To effectively implement ILM policies and account for unreliability in a geographically distributed large-scale storage system, "scanners" and "ILM rules appliers" can be deployed on nodes throughout the storage system for large scale ILM implementation. Each scanner is programmed to deterministically self-assign a region of object namespace and scan that region of object namespace. To "scan" a region, a scanner accesses metadata of each object that has an identifier within the scanner's region and inserts the object metadata into one of a set of queues for ILM evaluation. An ILM rules applier dequeues object metadata for evaluation against ILM rules and determines whether an ILM task is to be performed for ILM rule compliance.

20 Claims, 7 Drawing Sheets

(56) References Cited

U.S. PATENT DOCUMENTS

| | | | |
|---|---|---|---|
| 2014/0172874 A1* | 6/2014 | Rober | G10L 15/26 |
| | | | 707/748 |
| 2014/0289277 A1* | 9/2014 | Pinkney | G06F 16/11 |
| | | | 707/783 |
| 2015/0347043 A1* | 12/2015 | Barron | G06F 3/0619 |
| | | | 711/114 |
| 2016/0246676 A1 | 8/2016 | Bakre et al. | |
| 2017/0123976 A1* | 5/2017 | Motwani | G06F 3/0659 |
| 2017/0286239 A1* | 10/2017 | Baptist | G06F 11/1076 |
| 2018/0097708 A1* | 4/2018 | Winkelstrater | H04L 41/12 |

OTHER PUBLICATIONS

International Search Report and Written Opinion for Application No. PCT/US2018/030040 dated Jul. 4, 2018, 19 pages.
Josh Cates: Jun. 30, 2003, Retrieved from the Internet: http://citeseerx.ist.psu.edu/viewdocjdownload?doi=10.1.1.161.5943rep=rep1&type=pdf, retrieved on Jun. 21, 2018, XP055486835.
Sean., "OpenDHT: A public DHT service". Jun. 30, 2003, Retrieved from the Internet: https://pdfs.semanticscholar.org/f2de/921c522f858d816189a654943d10010b3a09.pdfretrieved on Jun. 21, 2018, XP055486803.
International Preliminary Report on Patentability for Application No. PCT/US2018/030040 dated Oct. 29, 2019, 16 pages.

\* cited by examiner

ITERATIVE OBJECT SCANNING FOR INFORMATION LIFECYCLE MANAGEMENT

BACKGROUND

The disclosure generally relates to the field of data processing, and more particularly to database and file management or data structures.

The Storage Networking Industry Association (SNIA) defines Information Lifecycle Management (ILM) as comprising "The policies, processes, practices, services and tools used to align the business value of information with the most appropriate and cost-effective infrastructure from the time information is created through its final disposition. Information is aligned with business requirements through management policies and service levels associated with applications, metadata, and data." An organization specifies a set of ILM rules to be applied to data. A collection of ILM rules can be specified in an ILM policy. Some factors that influence an ILM policy include cost of managing enterprise data, compliance with various laws and regulations across various jurisdictions and data domains (e.g., health related data), litigation readiness, and enterprise scale content management. Generally, accessibility requirements and value of data wears as time passes. Thus, an ILM policy will typically store less valuable data in a manner that reflects the decreasing value of the data (e.g., fewer copies, less resource intensive data protection, higher latency, etc.).

BRIEF DESCRIPTION OF THE DRAWINGS

Embodiments of the disclosure may be better understood by referencing the accompanying drawings.

FIG. 2 is a flowchart of example operations for iterative scanning of a self-assigned range of object namespace for information lifecycle management. FIG. 3 is a flowchart of example operations for applying an ILM rule set to object metadata enqueued from the iterative scanning. FIG. 4 is a flowchart of example operations for determining an ILM rule set to apply. FIG. 5 is a flowchart of example operations for self-assigning a range of an object namespace.

DESCRIPTION

Figure 1:
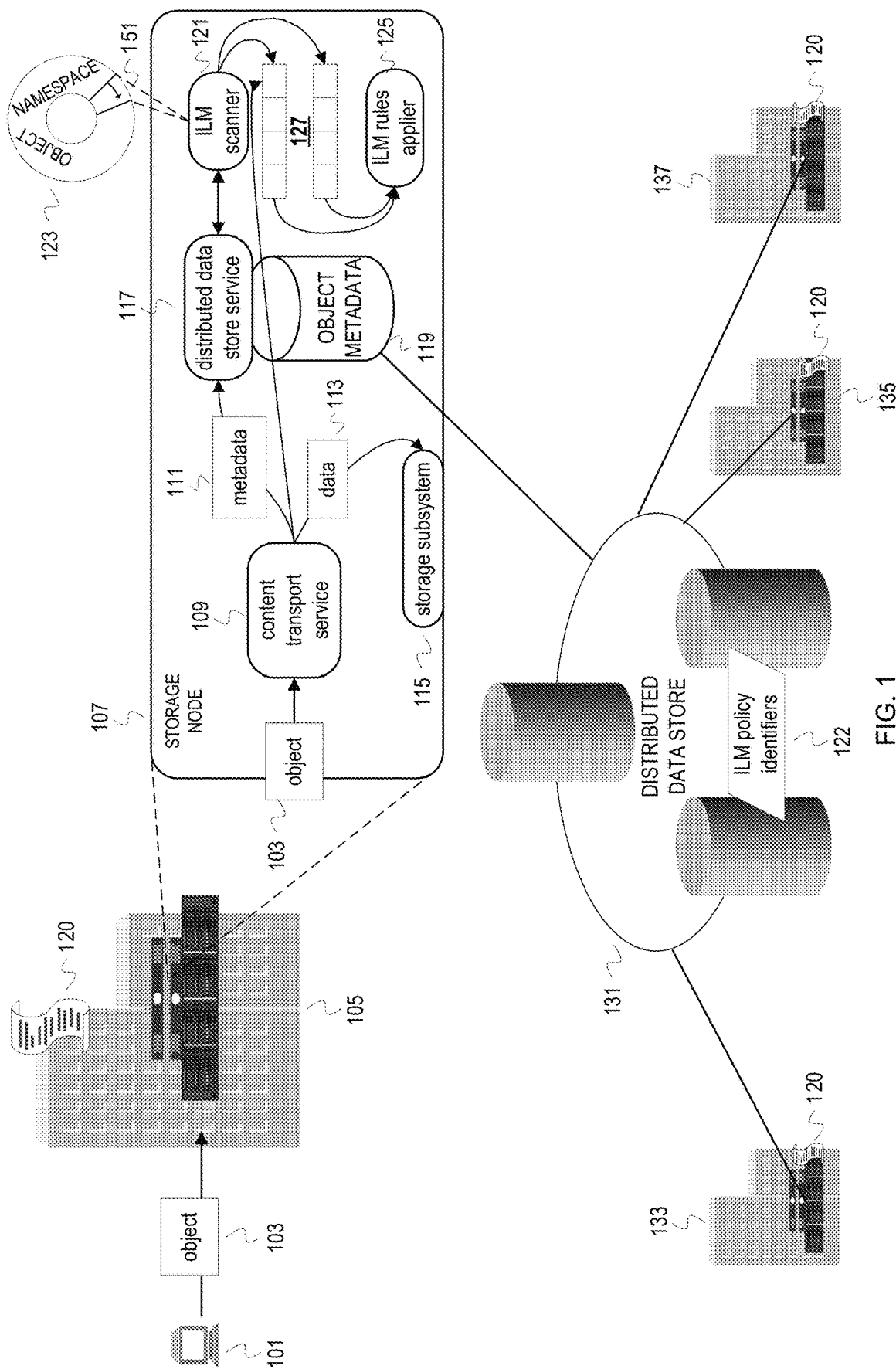
FIG. 1 is a conceptual diagram of a distributed storage system with distributed scanners for continuous evaluation of objects for information lifecycle object conformity.

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

Overview

The complexity of evaluating stored data against the ILM policies of an organization increases for a large-scale geographically distributed storage system managing a vast amount of data. Research by the International Data Corporation (IDC) estimated that the amount of data produced in 2014 was 4.4 zettabytes and forecasts a tenfold increase by the year 2020. As data production continues to grow from a variety of devices, the scale and capacity of storage systems will also grow. A large-scale distributed storage system comprises non-homogenous components or nodes of varying age. This variety of components/nodes, geographic distribution, and use/manufacture of lower cost higher capacity storage devices introduces unreliability (e.g., network partitioning, hardware failure, human error, etc.) as a factor in implementing ILM policies. Due to the unreliability factor, implementing ILM policies with a centralized paradigm for billions of data objects in a geographically distributed large-scale system is at least difficult, if not untenable.

To effectively implement ILM policies and account for unreliability in a geographically distributed large-scale storage system ("storage system"), "scanners" and "ILM rules appliers" can be deployed on nodes throughout the storage system for large scale ILM implementation. Each scanner is programmed to deterministically self-assign a region of object namespace and scan that region of object namespace. To "scan" a region, a scanner accesses metadata of each object that has an identifier within the scanner's region and inserts the object metadata into one of a set of queues for ILM evaluation. An ILM rules applier dequeues object metadata for evaluation against ILM rules and determines whether an ILM task is to be performed for ILM rule compliance. A task can involve multiple operations—for example a move task can involve a copy operation and a delete operation.

To meet the demands of ensuring compliance for a vast amount of data (e.g., billions of objects), each scanner iteratively scans across the storage system. To address unreliability, each scanner periodically or intermittently assesses its responsible region since it's region(s) may change based, at least partly, on state of the storage system. Storage system states at least include states related to storage system infrastructure, such as storage node states and states of communication links. The time for a single scanning iteration of a region can take an amount of time that allows the possibility of multiple scanners having overlapping object namespace ranges due to changes in storage system state (e.g., lost storage node or added storage node). Overlapping ranges can lead to an ILM policy being applied on a same object by multiple nodes, which can result in violation of the ILM policy. To avoid violations in this distributed paradigm, the ILM rules appliers are programmed to retrieve object metadata at a higher level of consistency if an ILM rule triggers a "risky" task (i.e., a task that has been identified as possibly leading to an undesired state of data).

Example Illustrations

FIG. 1 is a conceptual diagram of a distributed storage system with distributed scanners and ILM rule appliers for continuous evaluation of objects for information lifecycle management conformity. The distributed storage system ("grid") is geographically distributed across multiple sites that include sites 105, 133, 135, and 137, which communicate via a wide area network (WAN). Each of the sites houses multiple storage nodes and storage devices. A storage node is the collection of processes (application processes, services, etc.) that store object data and metadata to storage devices and access object data and metadata in storage devices. The collection of processes can be encapsulated by a virtual machine and/or a physical host machine. Storage nodes at any of the sites 105, 133, 135, and 137 can ingest objects into the grid. Ingest refers to the operations by one or more storage nodes to store an object in the grid according to a client request and any governing ILM policy(ies). The ingest process includes assigning an object identifier to an object based on an object namespace defined for the grid. Ingest can include an object being divided into its content data and metadata, caching, replication, erasure coding, etc.

Storage nodes of the grid apply a ILM policy 120 to objects at ingest and throughout the life of the objects in the grid. Each storage node of the grid is responsible for a different region of an object namespace 123. In this illustration, a subset of storage nodes ("administrative nodes") at each site in the distributed storage system maintains a copy of the ILM policy 120. A modification or replacement of the ILM policy can be made at one of the administrative nodes and communicated throughout the storage system to the other administrative nodes at the different sites. The constituent ILM rules are distilled from the ILM policy 120 and accessed by the ILM rules applier 125. To address the case of change in ILM policy, the grid maintains proposed and current ILM indications (ILM policy identifiers 122) in a distributed data store (or distributed database) 131 accessible to the storage nodes of the grid. To enhance utility, the ILM policies, current and proposed, are identified with identifiers derived from the constituent rules (e.g., hash values) to capture differences in rules. Examples of ILM rules include replication rules, storage grade or tier rules, data protection rules, etc. An ILM rule set is usually expressed as an ILM policy for coherent organization of the rules including prioritization. To apply an ILM policy or rule set, a storage node evaluates metadata of objects against each of the rules in the rule set in order of priority and determines whether an ILM task is to be performed based on the rule evaluation. To illustrate, a placement rule and storage grade rule may be triggered based on size and age of an object resulting in the object content data being moved to storage nodes at different sites assigned to a lower grade storage pool. The distributed data store 131 hosts the object metadata, although different distributed data stores can be used for the object metadata and the ILM policy identifiers 122. Since an ILM policy can be changed and the distributed data store 131 may be an eventually consistent distributed data store, the storage node across the grid may be applying different versions of an ILM policy or different ILM policies.

For this example illustration, a storage node 107 at the site 105 includes a content transport service 107, a storage subsystem 115, a distributed data store service 117, an ILM scanner 121, and an ILM rules applier 125. The content transport service 109 is a service that manages the initial operations for ingest of an object. The initial ingest operations handled by the content transport service 109 can include request handling, data storing, storage management, data transfer to another storage node, and operations of storage protocol interfaces. The data storing operations can include local caching of object content data and routing or storing of object metadata. The storage subsystem 115 interfaces with storage devices and/or external storage services for storing data to storage devices (physical or virtual) in response to commands or requests from the content transport service 109. The distributed data store service 117 performs operations corresponding to the distributed data store 131, including managing a local instance 119 of the distributed data store 131 that includes metadata of objects in the grid. The distributed data store service 117 handles requests from the content transport service 109 and the ILM scanner 121 that target the distributed data store 131. The ILM scanner 121 continuously scans object metadata of objects within a region(s) of the object namespace 123 self-assigned to the ILM scanner 121. The ILM scanner 121 requests object metadata from the distributed data store service 117, and enqueues object metadata into a set of queues 127 ("ILM metadata queues") based on evaluation priority. The ILM rules applier 125 selects object metadata from the ILM metadata queues 127, evaluates object metadata against the ILM rule set of the ILM policy 120, and performs a resulting ILM task depending on whether the task is risky.

For the FIG. 1 illustration, a client 101 requests storing of an object 103 into the grid. The storage node 107 of the site 105 receives this request and the object 103. The content transport service 109 determines an object identifier for the object 103 within the object namespace 123. The content transport service 109 divides the object 103 into object metadata 111 and content data 113 and associates both with the object identifier of the object 103. The object metadata 111 may indicate data size, data type, date of creation, time/date of ingest, data owner, etc. The metadata 111 can include metadata created by the storage node 107 (e.g., site identifier corresponding to the ingesting storage node) in addition to the metadata already indicated in the object 103. The content transport service 109 locally stores the data content 113 in storage devices of the site 105 via the storage subsystem 115 prior to an initial ILM evaluation (e.g., prior to fragmentation and fragment distribution across the code according to an erasure coding scheme). Thus, the metadata 111 will initially indicate the storage node 107 as location of the content data 113. However, this local caching is not necessarily implemented as part of ingest. The content transport service 109 requests the distributed data store service 117 to store the metadata 111 into the local instance 119 of the distributed data store 131. The content transport service 109 also inserts the metadata 111 into the ILM metadata queues 127. The content transport service 109 can be programmed to evaluate the object metadata 111 against the ILM policy 120 at ingest and perform the ILM tasks determined from the rule evaluation instead of delegating to the ILM rules applier 125. For this illustration, the ILM metadata queues 127 include a first priority queue and a second priority queue. The content transport service 109 inserts metadata for objects at ingest into the higher priority queue (i.e., first priority queue) of the queues 127. The ILM rules applier 125 can dequeue in a manner that biases to the first priority queue without starving the second priority queue (e.g., weighted round robin).

In the background, the ILM scanner 121 continuously scans the metadata of objects with identifiers within a region 151 self-assigned to the ILM scanner 121/storage node 107. The self-assignment can be considered as self-assignment to the storage node 107 since it can be based on an identifier of the storage node 107. The ILM scanner 121 iterates over each object identifier within the range 151 at a configured scan rate. The scan rate can be defined as a time period for retrieving metadata of a single object. The ILM scanner 121 can be programmed to adapt the scan rate to a number of objects within a self-assigned region(s) within defined boundaries (e.g., a minimum and maximum time periods for scanning a single object or a minimum and maximum time periods for scanning n objects). As already mentioned, the ILM scanner 121 will enqueue metadata of one or more objects into the queues 127. Furthermore, the ILM scanner 121 can enqueue metadata into the queues 127 based on prioritization driven by heuristics. The number or levels of priority will vary by implementation. For instance, third priority queue may be allocated for objects that have been deleted. When the ILM scanner 121 detects object metadata with a deletion marker, the ILM scanner can enqueue that object metadata into the third priority queue.

Independently, the ILM rules applier 125 iterates over the object metadata in the queues 127 according to the established priority scheme. In addition to different priorities for objects, some ILM tasks may be indicated as "risky," such as location changes, deletes, or tasks that impact the ILM rule set applied to the objects. "Risky" tasks can be identified in a configurable list of tasks against which the ILM rules applier 125 compares ILM tasks triggered by rule evaluation. These risky tasks are identified based on the potential for negatively impacting a data guarantee or availability when an ILM task is performed multiple times to a same object. As previously mentioned, the scale and transient aspects of the grid (e.g., decommissioning nodes, network partitions, hardware failures) allows the possibility of multiple storage nodes to scan and evaluate a same object as the grid adapts to a change, failure, and/or interruption. ILM tasks that lead to excess content data (e.g., superfluous replicas) can be resolved in subsequent scans without violating a fundamental data guarantee of availability. In contrast, repeating a delete can result in data loss. As an additional safeguard to avoid storage nodes from deleting too many copies of an object, the storage nodes/ILM rule set appliers are programmed to consistently select the same location/copy of an object for deletion. For instance, the ILM rule set appliers can be programmed to delete the copy of an object at a last identified location. However, the storage nodes/ILM rule set appliers are also programmed to order the object copies according to a canonical location ordering (i.e., pre-defined or previously agreed upon ordering). The canonical location ordering is based on each object (e.g., object identifier). This quasi-randomly distributes deletes throughout the grid. As an example, an ILM rule set applier can apply a logical combination (exclusive OR) to an object identifier and each of the location identifiers of the object. The ILM rule set applier then sorts the resulting list and selects for deletion the agreed upon ordinality. The quasi-random aspect of the object identifier generation allows the deletion in accordance with the canonical location ordering to be deterministically random.

FIGS. 2-5 are flowcharts of example operations for different aspects of the iterative object scan for ILM evaluation. Each of the figures refers to an ILM scanner or an ILM rules applier as performing the operations for consistency with FIG. 1.

Figure 2:
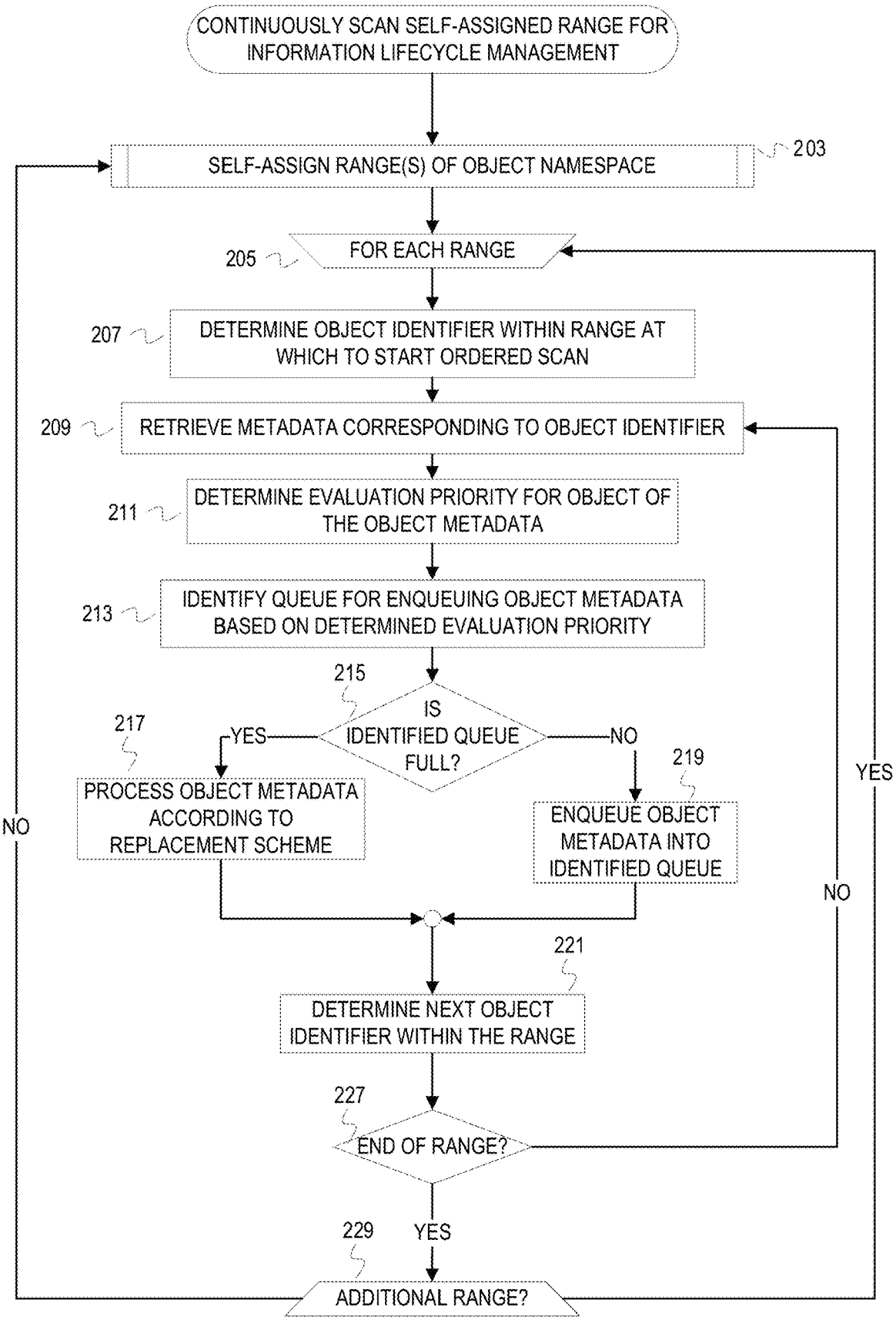
FIGS. 2-5 are flowcharts of example operations for different aspects of the iterative object scan for ILM evaluation.

FIG. 2 is a flowchart of example operations for iterative scanning of a self-assigned range of object namespace for information lifecycle management. After launch of an ILM scanner, the ILM scanner can continue scanning as a background process to retrieve and prioritize object metadata for ILM rule evaluation.

Figure 4:
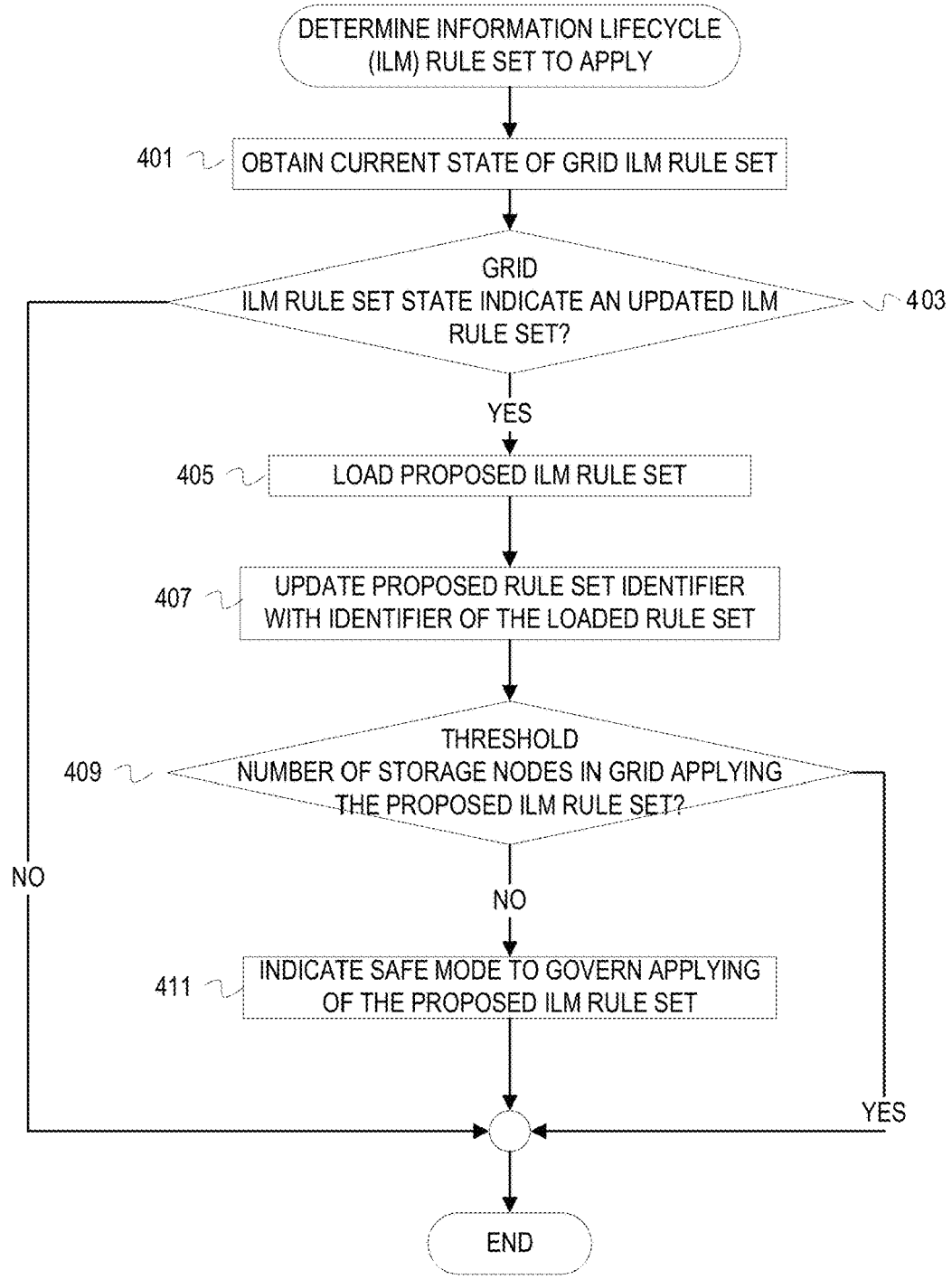

At block 203, the ILM scanner self-assigns one or more ranges of an object namespace. The object namespace is predefined for the storage node of the ILM scanner. The ILM scanner deterministically self-assigns the range(s) to facilitate ordered adaptation to grid events (e.g., node failure) without requiring coordination among the storage nodes. For example, the ILM scanner self-assigns one or more ranges of the object namespace based on an identifier associated with the ILM scanner (e.g., an identifier of the ILM scanner's storage node). The self-assignment at the beginning of each scan accommodates grid infrastructure changes (e.g., change in number of nodes, availability of nodes, connectivity among nodes, etc.), state changes, network events, etc. FIG. 4 provides example operations related to the self-assignment of one or more ranges of object namespace.

At block 205, the ILM scanner begins scanning within each range that has been self-assigned. An ILM scanner may self-assign more than one range for various reasons, such as temporarily scanning a part of a range of a scanner of a failed storage node in addition to a range for which the ILM scanner is primarily responsible. The ILM scanner will enqueue metadata of each object within each range ILM rule set application. A range being scanned is referred to as the selected range.

At block 207, the ILM scanner determines an object identifier within the selected range at which to start the scan. The ILM scanner can request a list of all object identifiers within the selected range. For example, the ILM scanner can invoke a distributed data store function with arguments that specify a minimum and maximum possible object identifier corresponding to the selected range. As another example, the ILM scanner can invoke a distributed data store function for the first object identifier within the selected range. The particular technique for determining and traversing the object identifiers within a range will depend upon the distributed data store, such as the functions defined by an application programming interface (API) of the distributed data store. The ILM scanner does not necessarily begin at the lowest object identifier within the selected range. The ILM scanner could begin each scan with the highest object identifier, begin in the middle of the range and alternate, or alternate between the lowest and highest between each scan.

At block 209, the ILM scanner retrieves metadata corresponding to the object identifier. With the determined object identifier, the ILM scanner requests the object metadata. To avoid the overhead of an API function call in subsequent scans, the ILM scanner can maintain retrieved object metadata in memory with an age or staleness indicator to trigger a refresh. If the cached object metadata competes with currently or recently retrieved object metadata for memory, the ILM scanner can give preference to the current/more recently retrieved object metadata in a replacement scheme.

At block 211, the ILM scanner determines an evaluation priority for the object of retrieved object metadata. As previously mentioned, the ILM scanner can determine an evaluation priority based on the object metadata alone or the object metadata and information about the grid. For instance, heuristic data can indicate previously observed conditions that can be represented in object metadata that led to performance of a repair task, which is attributed higher priority than other ILM related tasks. To make the priority determination, the ILM scanner may access topology information about the grid from an administrative service. As an example of the ILM scanner determining prioritization based on metadata alone, the ILM scanner can determine a low priority for an object if the object metadata indicates the object has been marked for deletion. In the case of ingest, the ILM scanner can determine highest priority for an object with metadata that indicates an ingest time within a defined time period (e.g., 1 minute window). In addition, the ILM scanner can defer evaluation for an object that has been recently updated. The ILM scanner can determine whether the retrieved object metadata indicates an update time that falls within a defined time period (e.g., preceding 10 minutes). If so, then the ILM scanner can disregard the object metadata (i.e., not enqueue the object metadata) and proceed to the next object identifier.

At block 213, the ILM scanner identifies a queue for enqueueing the object metadata based on the determined evaluation priority. The determined evaluation priority has a defined correspondence to a particular queue of a set of queues. For instance, a mapping of priority level to queue name or address. Embodiments can merge the determination of evaluation priority and identification of queue into a single determination—e.g., determination of priority queue for object metadata without a mapping between a priority indicator and queue identifier.

At block 215, the ILM scanner determines whether the identified queue is full. Since the configuration of nodes across the grid will vary, storage nodes can have different queue capacities. Storage nodes can implement a uniform replacement scheme or have heterogeneous replacement schemes that correspond to their queue capacities. If the identified queue is not full, then the ILM scanner enqueue the object metadata into the identified queue at block 219. If the identified queue is full, then the ILM scanner will process the object metadata according to the replacement scheme of the storage node. This can involve discarding the object metadata, overwriting other object metadata in the queue, and/or re-prioritizing objects. As one example, the ILM scanner can overwrite a most recently enqueued object metadata with the retrieved object metadata. Assuming age markers are maintained within the queue entries, the ILM scanner can overwrite object metadata that has persisted in the queue across the most scans. If a lower priority queue is not full, the ILM scanner could be programmed to move most recently enqueued object metadata or oldest object metadata to a lower priority queue to free an entry in the identified queue for the retrieved metadata. After either block 217 or block 219, control flows to block 221.

At block 221, the ILM scanner determines the next object identifier within the self-assigned range. If the ILM scanner has a list of object identifiers, it proceeds to the next in the list. As another example, the ILM scanner may request for a next object identifier relative to the current object identifier and within the range boundaries.

At block 227, the ILM scanner determines whether it has reached the end of the selected range. As examples, the ILM scanner may determine that it has reached an end of list or retrieve a null or failed response from the distributed data store. If the ILM scanner has reached the end of the selected range, then the ILM scanner determines whether there is another self-assigned range at block 229. If the ILM scanner has not reached the end of the selected range, then flow continues to block 209 to retrieve the metadata corresponding to the object identifier determined at 221. If there is an additional self-assigned range, then flow returns to block 205. If there is no additional self-assigned range, then flow returns to block 201 and the ILM scanner begins a new scan.

Figure 3:
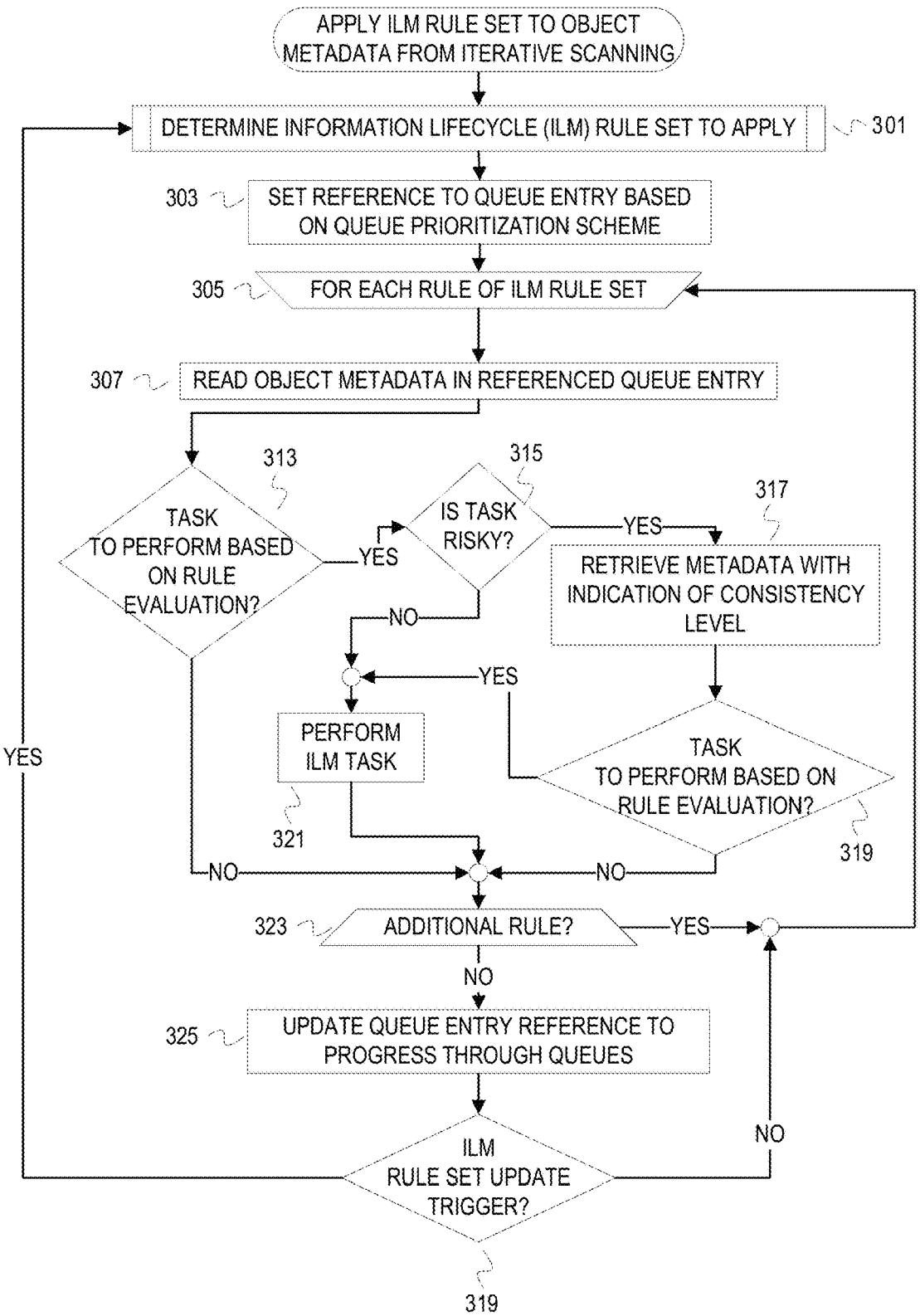

FIG. 3 is a flowchart of example operations for applying an ILM rule set to object metadata enqueued from the iterative scanning. FIG. 3 refers to the ILM rule set applier for consistency with FIG. 1. The ILM rule set applier will dequeue object metadata or iterate over the queue entries to evaluate the object metadata against the ILM rule set. If the ILM rule set applier evaluates a rule to a risky ILM task, then the ILM rule set applier can retrieve the object metadata at a higher consistency level.

At block 301, the ILM rule set applier determines an ILM rule set to apply. The ILM rule set applier loads the ILM rule set if not already loaded. For instance, an administrative service on a designated node or set of nodes at a site can maintain an authoritative rule set. Thus, the rule set applier requests/loads the rule set maintained by the rule set authority. Since an ILM rule set can be modified or replaced, the ILM rule set has an identifier that compactly expresses rule set content to allow efficient distinction between rule sets within a grid (e.g., identifiers for a current rule set and a proposed new/modified rule set). FIG. 4 provides example operations for determining an ILM rule set.

At block 303, the ILM rule set applier sets a reference to a queue entry based on a queue prioritization scheme being used. As described previously, the storage node may use multiple queues of different priorities for object metadata to be evaluation for ILM compliance/enforcement. The ILM rule set applier can initially set a pointer to the first entry of each queue and progress through each queue based on a weighted round robin scheme to ensure limited or finite bypass of lower priority queues. Other techniques of scheduling can be employed for the ILM rule set applier to progress through the queues.

At block 305, the ILM rule set applier begins evaluating each rule of the determined ILM rule set. A rule currently being evaluated is referred to as the selected rule. The ILM rule set applier traverses the rules according to an indicated order of evaluation.

At block 307, the ILM rule set applier reads the object metadata in the referenced queue entry.

At block 313, the ILM rule set applier determines whether an ILM task is to be performed based on evaluation of the selected rule. The ILM rule set applier evaluates the selected rule based on the object metadata. For instance, the selected rule may specify movement of an object to a lower latency storage pool 5 years from ingest and/or if a lifetime access count doesn't satisfy an access threshold. If a condition of the rule is satisfied that resolves to an ILM task, then flow proceeds to block 315. Otherwise, flow proceeds to block 323 at which the ILM rule set applier proceeds to evaluate the next ILM rule of the ILM rule set, if any.

At block 315, the ILM rule set applier determines whether the ILM task indicated for the selected rule based on the evaluation is a "risky" task. For instance, the ILM rule set applier determines whether the ILM task is indicated in a list of risky tasks or list of types of tasks that are risky. Determination of risk may not be static and can be dependent upon state of the corresponding object. For instance, a delete task can be indicated as conditionally risky. Parameters can be set that allow for the delete task to proceed as not risky if the object metadata indicates at least n replicas of the object exist and only an object replica with a replica indication greater than n can be deleted. This presumes a distributed data store that maintains indications of a copy or replica number with an object replica. If the task is not risky, then flow proceeds to block 321. If the task is determined to be risky, then flow proceeds to block 317.

At block 317, the ILM rule set applier retrieves the object metadata again. However, the ILM rule set applier includes an indication of a consistency level. This indication of the consistency level may require that all nodes of the grid indicate the same metadata, for example. This may involve a comparison of hashes of the metadata depending upon the distributed data store implementation. The consistency level indicated in the retrieval request is higher than the consistency level of the earlier retrieval request, assuming one was indicated when the ILM scanner retrieved the object metadata. The ILM rule set applier does not use cached metadata if retrieving metadata for a risky task.

At block 319, the ILM rule set applier determines whether evaluation of the selected rule against the metadata retrieved with the higher consistency level requirement still resolves to the risky task. For example, the rule may be to reduce the number of copies of an object to 2 from 3 after a specified time period. If the metadata at the higher consistency level indicates that 3 copies exist, then the rule still resolves to the delete task. However, inconsistency of the object metadata that fails the indicated consistency level can lead to deferring the rule evaluation for the object and skip further rule evaluation for the object until the next scan. In that case, flow proceeds to block 323.

If the task was determined to not be risky at 315 or the rule evaluation still resolved to the task with the higher consistency requirement for the object metadata at 319, then the ILM rule set applier performs the ILM task at block 321. After task performance, the ILM rule set applier determines whether there is another rule in the ILM rule set to evaluate at block 323. If there is an additional rule in the rule set to evaluate, then flow proceeds to block 305. Otherwise, flow proceeds to block 325.

At block 325, the ILM rule set applier updates the queue entry reference to progress through the queues. With multiple queues, the ILM rule set applier can maintain a reference for each queue to indicate a current entry and a reference or identifier that indicates which of the queues are currently selected. The ILM rule set applier may proceed to a lower priority queue according to the scheduling scheme and update the queue indicator/reference accordingly. If the ILM rule set applier has reached the end of a queue, then the ILM rule set applier may reset the reference to the first entry of the queue and update the queue indicator to a different queue.

At block 319, the ILM rule set applier determines whether an ILM rule set update trigger has occurred. This trigger may be periodic—i.e., expiration of a time period for ensuring the ILM rule set is current. The trigger may be detection of an event or notification of a rule set change. For instance, an administrative service may notify storage nodes of a new ILM policy or change to an ILM policy. The trigger can be interrupt driven instead of a periodic check. If a rule set update trigger has occurred, then flow returns to block 301. Otherwise, flow proceeds to block 305.

FIG. 4 is a flowchart of example operations for determining an ILM rule set to apply. As already mentioned, a change can be made to an ILM rule set to apply to objects of the grid. Since this can take time to propagate across the grid, ILM rule set appliers may be applying different rule sets. Because applying different rule sets can be problematic, the grid can maintain state information for the rule set(s) across the grid to safe application of rule sets through a rule set transition.

At block 401, an ILM rule set applier obtains a current state of a grid's ILM rule set. This data and the ILM rule set itself can be maintained in the distributed data store with the object metadata and/or a different distributed data store. The grid ILM rule set state data includes two ILM rule set identifiers for each storage node in the grid. An ILM rule set identifier compactly expresses content of the rules in a rule set. For instance, the rule set identifier can be a checksum derived from the rule set. Additional information, such as temporal information can also be maintained to further identify an ILM rule set to address concerns of collision The two identifiers will be referred to as a proposed rule set identifier and a current rule set identifier. If there has been no change, then these rule set identifiers will match. If there has been an ILM rule set change, then the proposed ILM rule set identifier identifies the updated ILM rule set until a condition (e.g., a majority of nodes are applying the proposed ILM rule set) is satisfied to update the current ILM rule set identifier to be the proposed rule set identifier. The ILM rule set applier can retrieve the ILM rule set identifiers with a high consistency requirement, such as a majority or quorum level of consistency.

At block 403, the ILM rule set applier determines whether the obtained grid ILM rule set state data indicates an ILM rule set change. The ILM rule set applier examines the proposed rule set identifiers of the storage nodes to determine whether any one has a different identifier than the current rule set identifier of the ILM rule set applier's storage node. Assuming checksums/hash values, this can be an efficient comparison operation. If the ILM rule set applier detects a different proposed rule set identifier, the different indicates a change or update. If temporal information is also used, the ILM rule set applier can compare temporal information to ensure the change/update is more recent than the current rule set being applied by the ILM rule set applier. If no change/update is detected, then the ILM rule set applier proceeds with applying the currently loaded rule set. If the ILM rule set applier detects a change/update of the ILM rule set, then flow proceeds to block 405.

At block 405, the ILM rule set applier loads the ILM rule set identified with the proposed rule set identifier corresponding to the detected change. For example, the ILM rule set applier requests from the administrative service of the grid the ILM rule set identified with the proposed rule set identifier.

At block 407, the ILM rule set applier updates its entry in the grid ILM rule set state data. The ILM rule set applier updates its proposed rule set identifier to be the proposed rule set identifier corresponding to the detected ILM rule set change. The ILM rule set applier may also indicate the creation/modification time of the loaded rule set.

At block 409, the ILM rule set applier determines whether a threshold number of storage nodes are applying the loaded rule set. The ILM rule set applier examines the grid ILM rule set state data to determine a count of the number of storage nodes that indicate the proposed rule set identifier. The threshold can be a configurable threshold. For example, the threshold can be a dynamic value, such as a percentage of the available nodes or nodes represented in the state data. If the threshold is satisfied, then the ILM rule set applier proceeds to safely apply the loaded ILM rule set.

If the threshold is not satisfied, then the ILM rule set applier records an indication that the loaded rule set should be applied in a safe mode at block 411. Applying the rule set in a safe mode allows the ILM rule set applier to proceed with the loaded ILM rule set despite the probability that another ILM rule set applier will be applying a different rule set. While in the safe mode, the ILM rule set applier does not perform risky ILM tasks. For instance, the ILM rule set applier may use a different or additional listing of risky ILM tasks or ILM task types as risky while in the safe mode. After indicating safe mode, the ILM rule set applier proceeds with applying the loaded ILM rule set in the safe mode.

Figure 5:
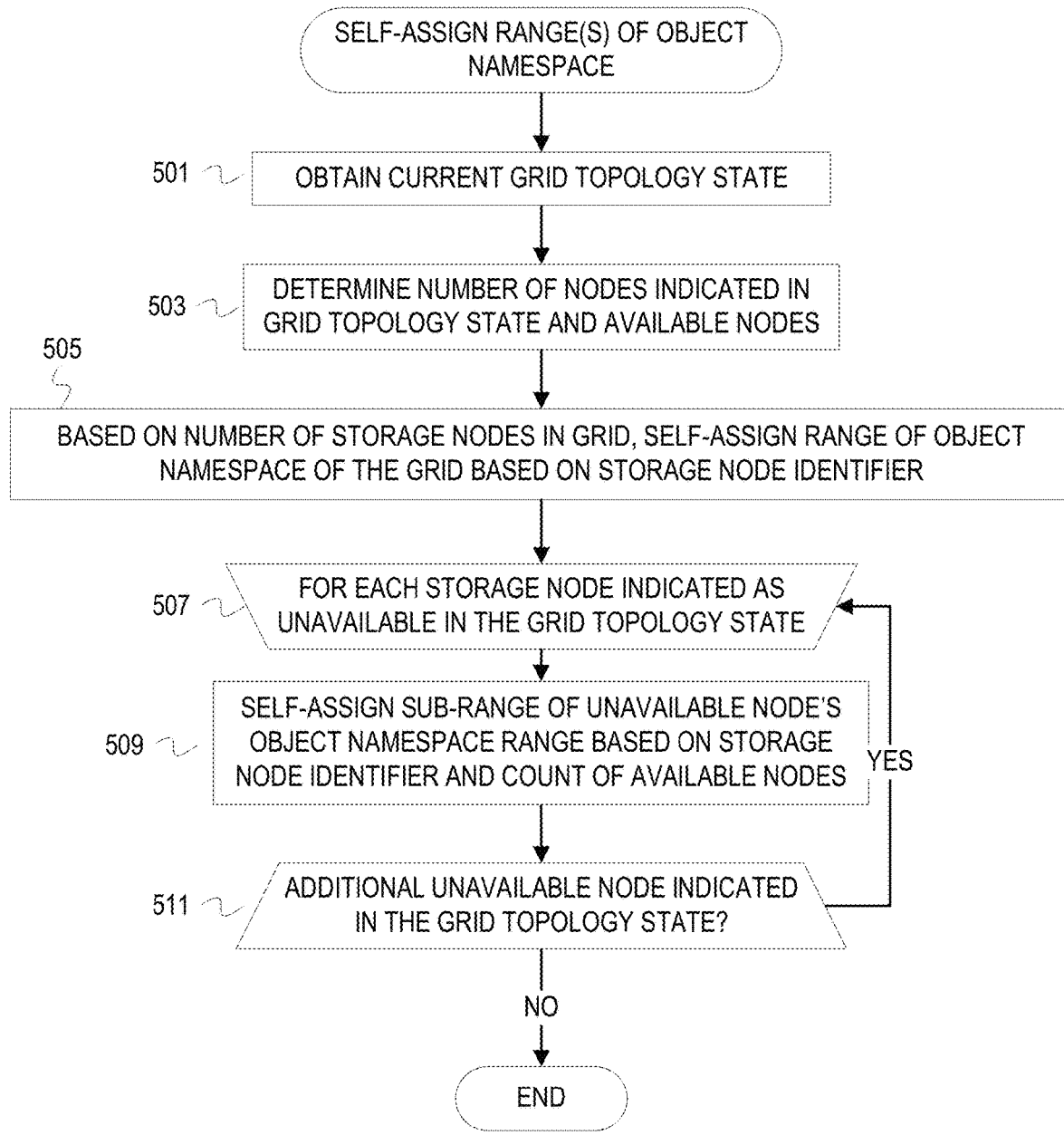

FIG. 5 is a flowchart of example operations for self-assigning a range of an object namespace. At the beginning of each scan, an ILM scanner will reassess its responsible region(s) to be scanned. The ILM scanner self-assigns a primary region for iterative scanning and then self-assigns additional regions of the object namespace in light of node failures, partitions, interruptions, etc.

At block 501, the ILM scanner obtains a current grid topology state. The ILM scanner requests the grid topology state from a topology service of the grid, which may be part of an administrative service. The grid topology service maintains a current state of the grid topology that indicates storage nodes that are available or unavailable. The grid topology state may also indicate locations of storage nodes and planned events (e.g., time periods of maintenance when nodes will be unavailable).

At block 503, the ILM scanner determines a count of nodes that are members of the grid as indicated in the grid topology state. The ILM scanner counts the number of storage nodes indicated in the grid topology state as members of the grid to establish the number of regions to divide the object namespace of the grid.

At block 505, the ILM scanner self-assigns a range of the object namespace of the grid based on the storage node identifier associated with the ILM scanner and based on the count of available storage nodes in the grid. With the number of member nodes in the grid, the ILM scanner determines the number of regions that the object namespace is to be divided. With the storage node identifier, the ILM scanner self-assigns one of those regions. The self-assignment depends upon how the grid assigns storage node identifiers. For example, a grid that assigns identifiers as storage nodes join the grid, either as a new node or a replacement node, can correlate the identifiers to the region (e.g., storage node 50 self-assigns the $50^{th}$ region of the object namespace spanning from object identifier 0 to object identifier $2^{64}$).

After self-assigning a primary region, the ILM scanner begins self-assigning sub-regions corresponding to unavailable nodes, if any, at block 507. The ILM scanner can also self-assign a sub-region of a region corresponding to a node with a planned unavailable event to account for future events impacting availability if indicated in the grid topology state. Assuming there is an unavailable node indicated in the grid topology state, the description refers to an unavailable node of an iteration as a selected unavailable node.

At block 509, the ILM scanner self-assigns a sub-range of a range corresponding to a selected unavailable node. The ILM scanner selects an object identifier indicated as unavailable in the grid topology state. The ILM scanner determines a range of the object namespace that would be scanned by the selected unavailable node based on the object identifier of the selected unavailable node. The ILM scanner then determines a part of that range to self-assign, similar to block 505. The ILM scanner determines a count of sub-ranges to divide the selected unavailable node's range based on a count of available storage nodes. The ILM scanner then determines which of the sub-ranges to self-assign based on the corresponding storage node identifier.

At block 511, the ILM scanner determines whether there is an additional unavailable node indicated in the grid topology state. If there is an additional unavailable node, then flow returns to block 507. Otherwise, the self-assignment process ends.

Figure 6:
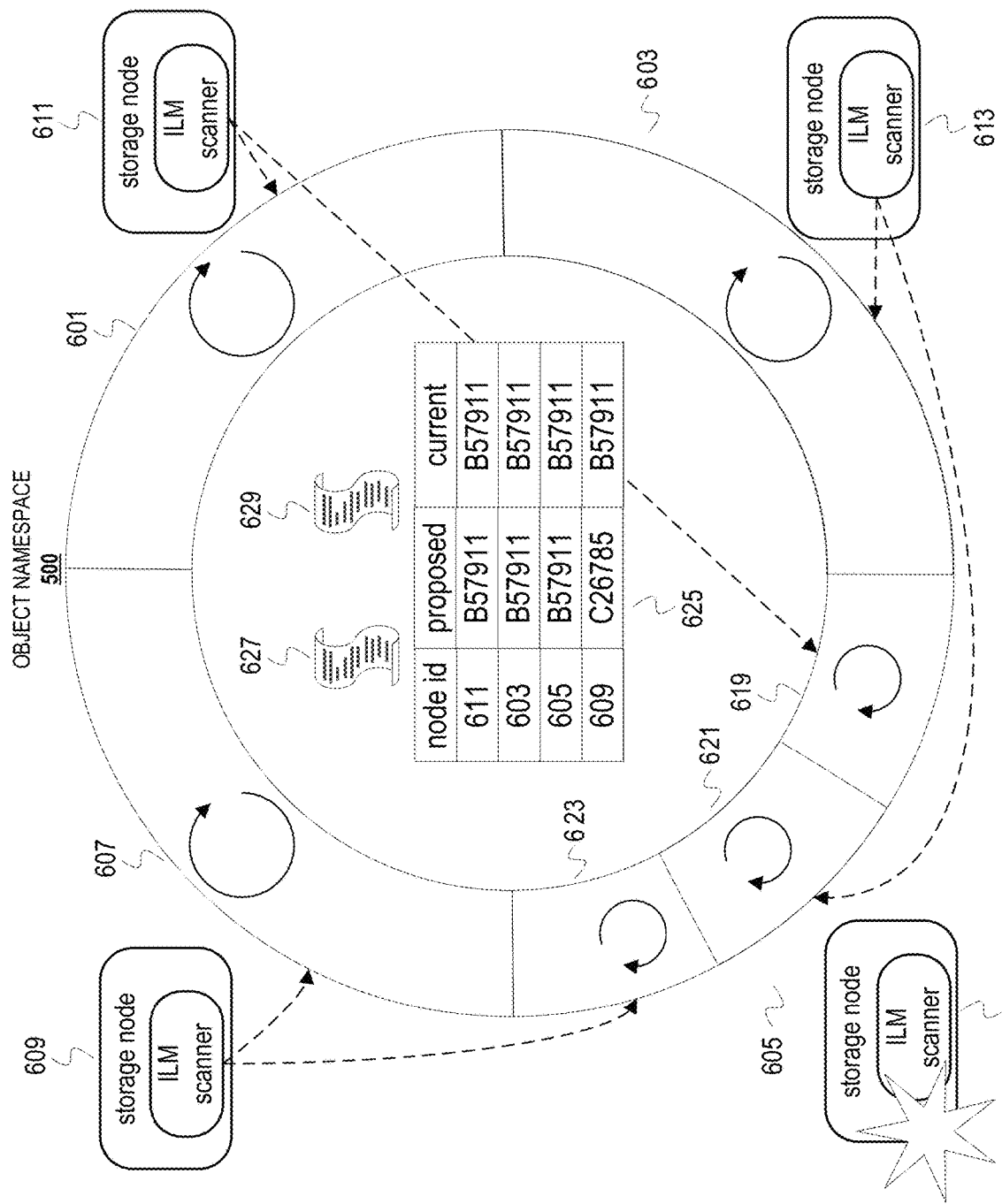
FIG. 6 is a conceptual diagram of storage nodes temporarily self-assigning sub-regions of a region of object namespace of a failed storage node.

FIG. 6 is a conceptual diagram of storage nodes temporarily self-assigning sub-regions of a region of object namespace of a failed storage node. Due to size constraints, FIG. 6 only depicts 4 storage nodes instead of a more likely scenario of hundreds of storage nodes. Although ranges of the object namespace seem to be distributed in a coordinated manner, the storage nodes do not coordinate and avoid the overhead of numerous storage nodes of a dynamic storage system (i.e., storage nodes can be added, removed, fail, etc.) coordinating range assignments.

In FIG. 6, storage nodes of a grid have self-assigned different regions of the grid's object namespace 600. Each of the storage nodes includes an ILM scanner that continuously scans a corresponding range(s) of the object namespace 600. A storage node 611 has self-assigned a region 601 for continuous scanning. A storage node 613 has self-assigned a region 603 for continuous scanning. A storage node 615 has self-assigned a region 605 for continuous scanning. A storage node 609 has self-assigned a region 607 for continuous scanning. In the state depicted in FIG. 6, an ILM rule set 627 and an ILM rule set 629 exist for the grid. One rule set may be a replacement or modification of the other rule set that has not yet propagated throughout the grid.

A structure 625 indicates an ILM rule set state for the grid. The structure 625 indicates node identifiers, a proposed rule set identifier for each node identifier, and a current rule set identifier for each of the storage nodes. When a storage node begins applying an ILM rule set communicated from an application or service that manages ILM policies for the grid (previously referred to as an administrative service), the storage node will update its proposed rule set identifier in the structure 625 to be the identifier of the communicated ILM rule set. A storage node may begin applying a proposed ILM rule set based on detection of another storage node applying the proposed ILM rule set with the data in structure 625 or detection of the ILM rule set from the administrative service. In this illustration, the ILM rule set 627 has identifier B57911 and the ILM rule set 629 has an identifier C26785. As represented by the structure 625, the storage nodes 611, 613, 615 are applying the rule set 627 and the storage node 609 is applying the rule set 629 in a safe mode.

At some point, the storage node 615 becomes unavailable. When the ILM scanner of each of the other storage nodes performs range self-assignment at the beginning of a scan while the storage node 615 remains unavailable, the ILM scanners each self-assign a portion of the range 605. The ILM scanner of the storage node 611 self-assigns the range 601 and a sub-range 619 of the range 605 corresponding to failed storage node 615. As previously mentioned, the ILM scanner will determine that the storage node 615 is unavailable, determine the range 605 of the object namespace 600 based on the identifier of the storage node 615, and then determine the sub-range 619 based on the identifier of the storage node 611. The same process is done by the ILM scanner of the storage node 613 to self-assign a sub-range 621 and by the ILM scanner of the storage node 609 to self-assign a sub-range 623. Each ILM scanner then scans the self-assigned ranges. At the beginning of the next scan, each ILM will again self-assign, which may change based on a variety of events in the grid. Examples of the grid events include addition of a storage node, return of the storage node 615 to being available, loss of another storage node, a network partition, etc.

Variations

The determination of whether an ILM task resolved to from a rule evaluation is not static. Whether an ILM task is risky may not be determined solely on indication of the task or task category in a list. Determination of whether a task is risky can also be based on state of the grid. For instance, a move task may be risky if a network partition is detected but not risky if all sites are visible to a storage node according to topology state. In addition, the consistency requirement for retrieving metadata can vary based on grid state. For instance, a metadata retrieval that would require majority consistency during normal grid state (normal being administratively defined, such as a percentage of grids available) can increase to 100% consistency if the grid is at less than optimal operating capability.

The ILM queues have been described as a set of priority queues. The ILM scanner can be programmed to weigh each queue corresponding to priority. The weights can be modified to account for changes in resources for performing ILM tasks, number of deferred tasks, load on a part of the grid corresponding to an ILM scanner, etc. Furthermore, sizes of queues can vary based on resources of a host storage node.

Although the example illustrations describe an ILM scanner as determining number of grid nodes to determines its region and then determining additional regions for unavailable nodes, the series of determinations can be avoided when the grid topology state remains unchanged from a previous scan. The ILM scanner can initially perform an expedited determination of whether grid topology state has changed. If it has not, then the ILM scanner can proceed scanning the same region or regions of the previous scan. For instance, the ILM scanner can compute a hash of the grid topology state to efficiently determine whether grid topology state has changed. In addition, embodiments do not necessarily self-assign a region of the object namespace based on numbers of storage nodes and storage node identifier. A storage node can evaluate object metadata that can be accessed with lower latency based on object layout in the distributed storage system (e.g., evaluate metadata on storage devices locally accessible or located within a same site). The storage node can augment a determined region for iterative scanning. The storage node may determine the region based on the locally accessible object metadata.

The description describes the determination of riskiness as a comparison between a determined ILM task and a listing of risky tasks or task types. However, the determination of whether an ILM task is risky can be dynamic and/or storage nodes can handle an ILM task differently to decrease the likelihood of the ILM task being risky. A storage node can determine whether an ILM task is risky based on the corresponding object metadata and state of the distributed storage system ("system state"). After resolving an ILM rule to an ILM task, an ILM rules applier can compare the object metadata and system state against time thresholds to accommodate eventual consistency of the object metadata. For example, the ILM rules applier can determine an ILM task to be risky if the amount of time between a timestamp on the object metadata and local clock of the ILM rules applier exceeds a threshold. The ILM rules applier can also delay action when object metadata has been recently updated—"recently" being a configurable time window. For example, the ILM rules applier can delay performing an ILM task to allow further propagation of the object metadata update throughout the distributed storage system before performing the ILM task. The ILM rules applier can delay requesting the object metadata at the higher consistency level if the already retrieved metadata has a recent update timestamp. Furthermore, the ILM rules applier can determine that an ILM task is risky based on detection of an inconsistency or potential issue between the distributed storage system and the host device. For example, the ILM rules applier can evaluate a current time indicated by one or more storage nodes of the grid and a local clock. Deviation in either direction beyond an acceptable threshold suggests applying the ILM task may be problematic. The ILM rules applier can also compare a timestamp in object metadata against a local clock to determine whether the local clock is behind the object metadata and deem a corresponding ILM task risky based on the negative deviation.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, In FIG. 3, the ILM rule set applier determines the ILM rule set to apply at the beginning of each iteration and prior to beginning a new iteration. Embodiments can determine the ILM rule set to apply at other times during a scan and/or based on detection of events. For instance, the ILM scanner may determine the ILM rule set to apply when a change event is communicated from a service that manages the ILM policies. The ILM scanner can also determine the rule set to apply at given intervals that can be based on time and/or number of objects evaluated within an iteration. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Program code for carrying out operations for aspects of the disclosure may be embodied as instructions in various forms depending on implementation. For example, instructions may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
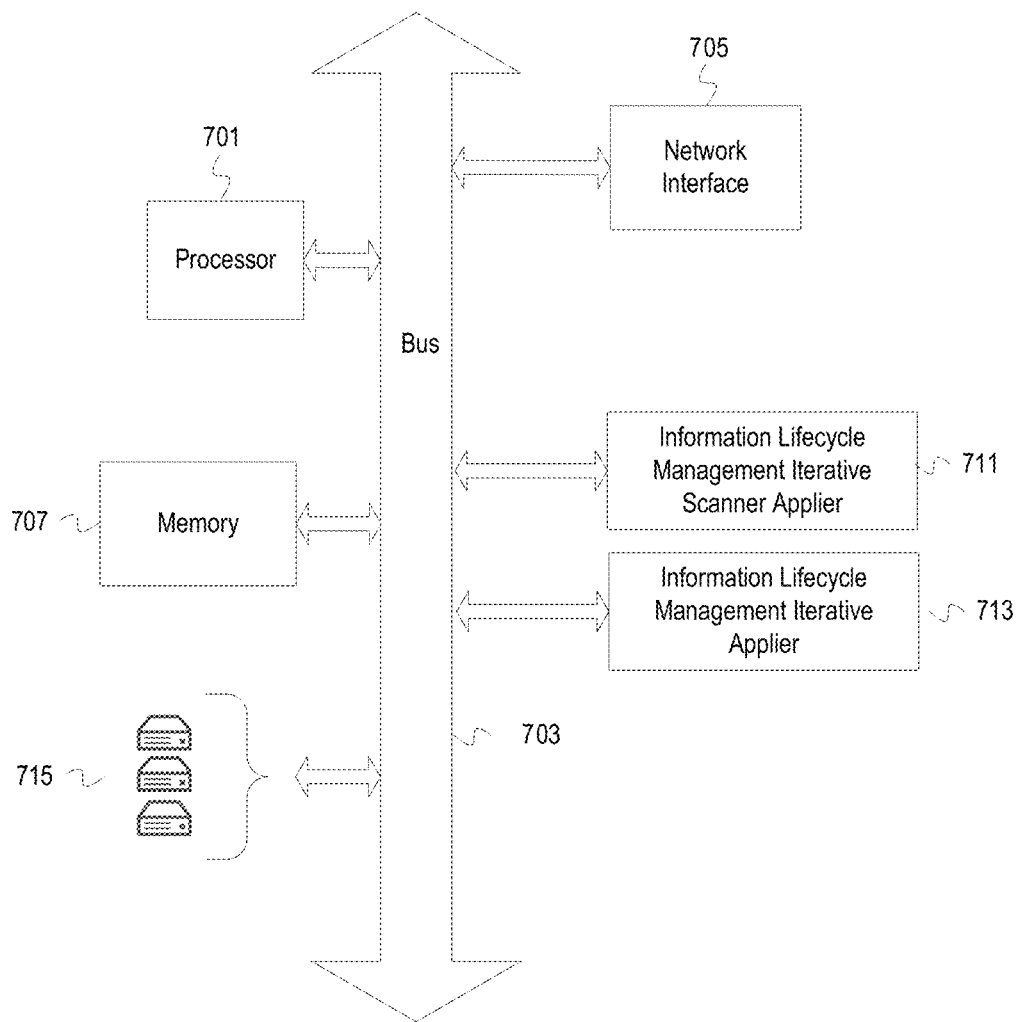
FIG. 7 depicts an example computer system with an information lifecycle management iterative scanner.

FIG. 7 depicts an example computer system with an information lifecycle management iterative scanner. The computer system includes a processor 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes a set of storage devices 715 which can be magnetic storage device, optical storage devices, solid state storage devices, and/or a hybrid of storage devices. The computer system may submit read and write requests via the network interface 705 or a separate interface (e.g., a small computer system interface). The system also includes an ILM iterative scanner 711. The ILM iterative scanner 711 is one of many instances throughout a grid that will collectively scan a grid's object namespace, with potential overlapping scans between scanners. To adapt to changes in the grid, the ILM iterative scanner 711 will self-assign one or more ranges of the object namespace for scanning, and then scan the self-assigned range or ranges. Concurrently, an ILM iterative applier 713 will apply an ILM rule set of the grid to objects based on object metadata obtained from the iterative scanning by the ILM iterative scanner 713. Any one of the described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 6 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for continuously scanning a grid's object namespace for ILM as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   in a first storage node of a plurality of storage nodes of a distributed storage system, determining a first region of an object namespace to self-assign for information lifecycle management responsibility;
   determining a sub-region of a second region of the object namespace to self-assign for information lifecycle management responsibility, the sub-region being based on an identifier of a second storage node and on dividing the second region by a number of available nodes in the distributed storage system, the second storage node being unavailable and primarily responsible for the sub-region;
   self-assigning the first region and the sub-region by the first storage node;
   evaluating object metadata of objects within the self-assigned first region and the sub-region for information lifecycle management, including, for each determined object identifier within the first region and the sub-region:
      retrieving object metadata corresponding to the object identifier;
      evaluating a set of one or more information lifecycle management rules against the retrieved object metadata;
      based on an evaluation resolving to an information lifecycle management task determined to be a risk for data loss of an object corresponding to the object identifier, requesting from the distributed data store object metadata corresponding to the object identifier at a consistency level; and evaluating the set of one or more information lifecycle management rules against received object metadata.

2. The method of claim 1, wherein determining the first region based on states of the plurality of storage nodes comprises determining a plurality of regions of the object namespace that includes the first region based on a count of the plurality of nodes and selecting the first region from the plurality of regions based on the identifier of the storage node.

3. The method of claim 1 further comprising, in each iteration, determining those of the storage nodes of the plurality of storage nodes indicated as unavailable by the states of the plurality of storage nodes.

4. The method of claim 1 further comprising determining whether an information lifecycle management task resolved to from evaluation of a rule of the set of one or more information lifecycle management rules is the risk for data loss of the object.

5. The method of claim 1, wherein evaluation resolving to the information lifecycle management task determined to be the risk for data loss of the object comprises determining whether the information lifecycle management task is indicated in a defined set of tasks indicated as the risk for data loss of the object or is of a task type indicated in a defined set of task types indicated as the risk for data loss of the object.

6. The method of claim 1, further comprising, in each iteration, selecting one of a set of queues based on a priority attributed to the retrieved object metadata and enqueueing the retrieved object metadata into the selected one of the set of queues.

7. The method of claim 1, further comprising determining the priority based, at least in part, on whether an object corresponding to the retrieved object metadata is being ingested into the distributed storage system.

8. The method of claim 1, wherein the consistency level comprises a specified amount of the storage nodes having the same object metadata within the received object metadata.

9. A non-transitory machine readable medium having stored thereon instructions for performing a method comprising machine executable code which when executed by at least one machine, causes the machine to:
determine a first part of an object namespace to self-assign for information lifecycle management wherein the part of the object namespace is self-assigned to a first node of a plurality of storage nodes;
determine a sub-part of a second part of the object namespace to self-assign for information lifecycle management based on an identifier of a second storage node of the plurality of storage nodes and on dividing the second part by a number of available storage nodes, wherein the sub-part of the object namespace is self-assigned to the first node, the second storage node being unavailable and primarily responsible for the second part of the object namespace;
for each determined object identifier within the first part and the sub-part of the object namespace:
retrieve metadata corresponding to the object identifier;
evaluate an information lifecycle management rule with the retrieved metadata to determine whether to perform an information lifecycle management task on an object identified by the object identifier;
based on a determination that the information lifecycle management task is indicated as a risk for data loss of an object corresponding to the object identifier;
request from the distributed data store metadata corresponding to the object identifier with an indication of a consistency level; and
re-evaluate the information lifecycle management rule with metadata returned from the distributed data store satisfying the consistency level to determine whether to perform the information lifecycle management task on the object identified by the object identifier.

10. The non-transitory machine-readable medium of claim 9, wherein the instructions to determine the first part of the object namespace to self-assign for information lifecycle management based, at least in part, on state data of the distributed storage system comprises the instructions to determine the first part of the object namespace also based on an identifier of the first node.

11. The non-transitory machine-readable medium of claim 9, wherein the instructions to determine the first part of the object namespace to self-assign for information lifecycle management based, at least in part, on state data of the distributed storage system comprises the instructions to determine a count of storage nodes in the distributed storage system indicated by the state data of the distributed storage system and divide the object namespace according to the count of storage nodes in the distributed storage system, wherein the self-assigned first part corresponds to the identifier of the first node.

12. The non-transitory machine-readable medium of claim 9, wherein the instructions to determine the first part of the object namespace based on state data of the distributed storage system further comprises the instructions to determine storage nodes indicated as unavailable in the state data.

13. The non-transitory machine-readable medium of claim 9, wherein the consistency level specifies an amount of the storage nodes returning the same metadata.

14. A computing device comprising:
a memory containing machine readable medium comprising machine executable code having stored thereon instructions for performing a method of information lifecycle management;
a processor coupled to the memory, the processor configured to execute the machine executable code to cause the processor to:
assign a first region of an object namespace and a sub-region of a second region of the object namespace to a first storage node of a plurality of storage nodes for information lifecycle management responsibility and evaluate object metadata of objects within the first region and the sub-region for information lifecycle management, including,
determine the first region and further self-assigning the first region by the first storage node;
determine the sub-region based on an identifier of a second storage node and on dividing the second region by a number of available storage nodes, the second storage node being unavailable and primarily responsible for the second region;
for each object identifier within the first region and the sub-region, retrieve object metadata corresponding to the object identifier;
evaluate a set of one or more information lifecycle management rules against object metadata responsive to the request;
based on an evaluation resolving to an information lifecycle management task determined to be a risk for data loss of an object corresponding to the object identifier, request from the distributed data store object metadata corresponding to the object identifier at a consistency level; and evaluate the set of one or more information lifecycle management rules against received object metadata.

15. The computing device of claim 14, wherein the machine executable code to determine the first region based on states of the plurality of storage nodes comprises code executable by the processor to determine a plurality of regions of the object namespace that includes the first region based on a count of the plurality of nodes and to select the first region from the plurality of regions based on the identifier of the first storage node.

16. The computing device of claim 14, wherein the machine-readable medium further comprises machine executable code to, in each iteration, determine those of the storage nodes of the plurality of storage nodes indicated as unavailable by the states of the plurality of storage nodes.

17. The computing device of claim 14, wherein the machine-readable medium further comprises machine executable code to determine whether an information lifecycle management task resolved to from evaluation of a rule of the set of one or more information lifecycle management rules is the risk for data loss of the object.

18. The computing device of claim 14, further comprising code executable by the processor to cause the computing device to determine whether the information lifecycle management task is indicated in a defined set of tasks indicated as the risk for data loss of the object or is of a task type indicated in a defined set of task types indicated as the risk for data loss of the object.

19. The computing device of claim 14, wherein the machine executable code to retrieve the object metadata comprises code executable by the processor to cause the computing device to obtain the object metadata from a local cache if available or request the object metadata from the distributed data store.

20. The computing device of claim 14, wherein the machine-readable medium further comprises code executable by the processor to cause the computing device to, based on the information lifecycle management task being a delete task, consistently select for deletion a location from a plurality of locations of an object corresponding to the object identifier according to a deterministically randomized ordering of the plurality of locations.

* * * * *